W. L. BOWER.
Land Marker.
No. 82,282.
Patented Sept. 22, 1868.
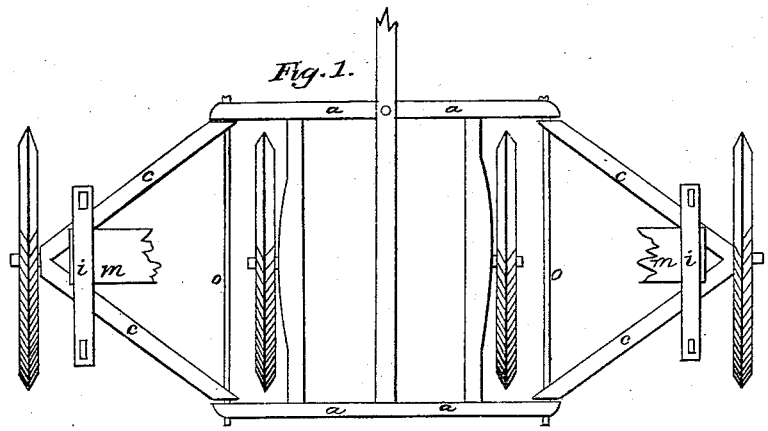
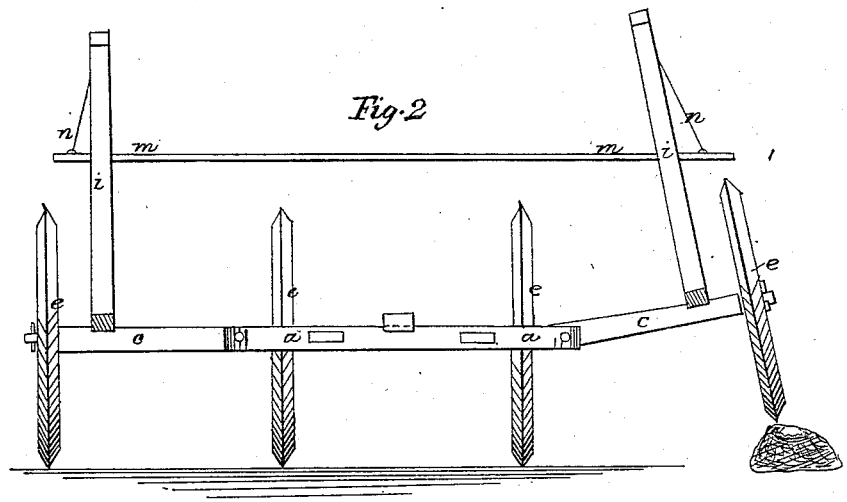

United States Patent Office.

WESLEY L. BOWER, OF JOLIET, ILLINOIS.

Letters Patent No. 82,282, dated September 22, 1868.

IMPROVEMENT IN LAND-MARKERS.

*The Schedule referred to in these Letters Patent and making part of the same.*

Be it known that I, WESLEY L. BOWER, of the town of Joliet, in Will county, and State of Illinois, have invented a new and useful Improvement on a Land-Marker; and I do hereby declare the following to be a full, clear, and exact description of the same, reference being had to the annexed drawings, making a part of this specification, in which—

Figure 1 is a plan view of the top, and

Figure 2 a side elevation of the same.

The nature of my invention consists in the arrangement of any number of marking-wheels, with a V-shaped periphery in a hinged or jointed frame, so that the whole machine may accommodate itself to the uneven surfaces of the ground, as shown in the figures.

Fig. 1 shows the main frame, a, provided with the wheels e, and at either end with the frame c hinged thereto by means of the rods o, at the ends of which marking-wheels e are attached, as shown.

It will be seen that by means of the frame being hinged, as described, either of the marking-wheels e may be allowed to pass over obstructions without interfering with the others, as shown in fig. 2.

Resting on the frame c is the upright frame i, in which hangs the swing-seat m, on which the driver sits. This seat swings from the cross-bar of the frame i by the rods n, and allows free play to all the parts. By thus arranging the seat, the weight of the driver is placed on the two outer wheels, so as to more effectually hold them down to their work.

By taking out the seat m, the two outer frames, c, with their marking-wheels, may be folded over on to the main frame, a, so as to make it easy to go from place to place, or go through a narrow gate or bars.

By the use of wheels instead of runners, as in the old way, the machine is made to run very easily, and is very handy to turn round, besides making a very much better and plainer mark.

Claim.

Having thus described my invention, what I claim as new in my invention, and desire to secure by Letters Patent, is as follows:

I claim the combination of the swing-seat m and upright frame i with the hinged frame c, all arranged and operating as and for the purposes set forth.

WESLEY L. BOWER.

Witnesses:
THOS. H. HUTCHINS,
F. L. CAGWIN.